(12) United States Patent
Dewhurst et al.

(10) Patent No.: US 10,735,669 B2
(45) Date of Patent: Aug. 4, 2020

(54) METHOD OF FLICKER REDUCTION

(71) Applicant: Apical Ltd, Cambridge (GB)

(72) Inventors: Andrew Dewhurst, Barrow-Upon-Soar (GB); David Hanwell, Stapleford (GB)

(73) Assignee: Apical Ltd., Cambridge (GB)

( * ) Notice: Subject to any disclaimer, the term of this patent is extended or adjusted under 35 U.S.C. 154(b) by 15 days.

(21) Appl. No.: 16/104,298

(22) Filed: Aug. 17, 2018

(65) Prior Publication Data

US 2019/0058823 A1 Feb. 21, 2019

(30) Foreign Application Priority Data

Aug. 18, 2017 (GB) .................................. 1713279.6

(51) Int. Cl.
*H04N 5/235* (2006.01)

(52) U.S. Cl.
CPC ......... *H04N 5/2357* (2013.01); *H04N 5/2355* (2013.01)

(58) Field of Classification Search
CPC .......................... H04N 5/2357; H04N 5/2355
See application file for complete search history.

(56) References Cited

U.S. PATENT DOCUMENTS

| 2007/0153094 | A1* | 7/2007 | Noyes | H04N 5/235 348/226.1 |
| 2008/0316333 | A1 | 12/2008 | Furuya et al. | |
| 2009/0002520 | A1* | 1/2009 | Yoshida | H04N 5/2351 348/226.1 |
| 2014/0078358 | A1 | 3/2014 | Takenaka et al. | |
| 2014/0153839 | A1 | 6/2014 | Tsuzuki | |
| 2014/0267815 | A1* | 9/2014 | Koizumi | H04N 5/2355 348/218.1 |
| 2014/0375848 | A1* | 12/2014 | Yamamoto | H04N 5/2355 348/241 |
| 2017/0041542 | A1* | 2/2017 | Ono | H04N 5/23254 |
| 2017/0150030 | A1 | 5/2017 | Nakamura et al. | |
| 2017/0264831 | A1 | 9/2017 | Hyuga | |
| 2018/0324344 | A1* | 11/2018 | Kinoshita | H04N 5/232 |
| 2019/0037157 | A1* | 1/2019 | Matsumura | H04N 5/2357 |

FOREIGN PATENT DOCUMENTS

| EP | 3217652 A1 | 10/2015 |
| JP | 2004112572 A | 4/2004 |
| JP | 2015142201 A | 8/2015 |
| WO | 2015141925 A1 | 9/2015 |

OTHER PUBLICATIONS

Combined Search and Examination Report dated Jan. 30, 2018 for GB Application No. GB1713279.6.

* cited by examiner

*Primary Examiner* — Jason A Flohre
(74) *Attorney, Agent, or Firm* — EIP US LLP

(57) ABSTRACT

A method for reducing artefacts caused by the presence of flicker during image capture. The method comprises performing image capture to produce image capture data corresponding to an image capture scene, the image capture data including a first image having a first exposure and a second image having a second exposure. The image capture data is processed to: (a) detect a discrepancy in the second image with respect to the first image; and (b) determine flicker indication data indicative of a presence of flicker in the second image. The discrepancy is corrected in dependence upon the flicker indication to produce a flicker-reduced version of the second image.

20 Claims, 11 Drawing Sheets

METHOD OF FLICKER REDUCTION

CROSS-REFERENCE TO RELATED APPLICATIONS

This application claims priority to GB Application No. 1713279.6, filed Aug. 18, 2017, under 35 U.S.C. § 119(a). Each of the above-referenced patent applications is incorporated by reference in its entirety.

BACKGROUND OF THE INVENTION

Field of the Invention

The present invention relates to methods, apparatus and computer readable storage media for reducing artefacts caused by the presence of flicker during image capture.

Description of the Related Technology

Certain known light sources do not produce a constant light intensity, but instead flicker. Such flickering is a periodic varying in intensity between a minimum intensity, such as zero intensity, and a maximum intensity. The time dependence of the intensity can have various shapes, such as a step function or a sinusoid.

Flicker can be a consequence of the light source being powered by alternating current, such as a sinusoidally varying current with a frequency of 50 Hz or 60 Hz. Electrical power varies as the square of the current, and thus flicker arising from an alternating current has a frequency of double the current frequency. For example, a flicker arising from a 50 Hz current would have a frequency of 100 Hz.

Flicker can be intentionally induced, for example to reduce the overall perceived intensity of a light source. As an example, a light emitting diode (LED) can be cycled between an "on" state and an "off state". If this cycling has a frequency faster than around 100 Hz, it will typically not be perceived as flicker by a human observer but will instead be perceived as a constant intensity lower than that corresponding to the "on" state. LED light fixtures, such as LED street lamps, typically perform such cycling to achieve a desired overall light intensity.

When image capture, for example of still images or video, is performed in the presence of a flickering light source, artefacts may be produced in the captured images. For example, if the capturing of video frames is not synchronised with the flicker, "beat" artefacts may be produced, analogously to the audio beats that are produced when sounds of slightly different frequencies are superposed. As another example, where still images are captured by a camera with a shutter, particular images may be darker or brighter than would be expected based on the overall time-averaged light intensity, depending on the relative timing of the flickering and of the shutter activation.

FIG. 1A shows a schematic example of the origin of such artefacts. A graph 100 depicts the intensity 105 of a flickering light source. In this example, the intensity of the light source varies as a step function between "off" periods at a minimum intensity 110, which may be zero, and "on" periods at a maximum intensity 115. A first image is captured with an exposure time 120. The exposure time of the first image covers two "off" periods and three "on periods". A second image is captured with an exposure time 125. This exposure time 125 has the same length as the exposure time 120 of the first image, but covers three "off" periods and two "on periods". The first image is thus brighter than the second image, despite being captured in the presence of the same light source. If the first and second images are video frames, the video would be seen to alternate between bright and dark frames. In a scene with more than one flickering light source, more complicated flicker artefacts can occur.

While this example would lead to a global brightness difference between the first and second images, flicker can also lead to local artefacts.

FIG. 1B shows a schematic example process by which local flicker artefacts may arise. A flickering light source has a varying intensity 105 as described above in relation to FIG. 1A. An image sensor, for example of a video camera, has a pixel array which is read in a row-by-row or column-by-column fashion. For example, over a single full exposure time 130, a pixel in a given corner of the array is read first. The pixel adjacent to this is then read, and so on until the end of the first row is reached. This process is then repeated for the next row, and so on until the entire pixel array has been read. From the data read over the entire array, an output image 135 is produced.

During a first part 140 of the full exposure time 130, the flickering light source is "on". This leads to a correspondingly bright band 145 in the output image 135. During a second part 150 of the full exposure time 130, the flickering light source is "off". This leads to a correspondingly dark band 155 in the output image 135. Finally, during a third part 160 of the full exposure time 130, the flickering light source is "on" again. This leads to a second bright band 165 in the output image 135. The brightness thus varies locally over the image as a consequence of the flicker, leading to a "banding" artefact.

Flicker artefacts such as those described above can be visible in the captured images even when the flickering itself is sufficiently fast as to not be observable by a human. This reduces the quality of the captured images as perceived by a human observer. Flicker artefacts also present problems for computer processing of the captured images. For example, where the captured images are used to navigate an automated vehicle, the flicker artefacts may compromise the navigation. There is thus a need for methods to reduce flicker artefacts in captured images.

SUMMARY

According to a first aspect of the present invention, there is provided a method for reducing artefacts caused by the presence of flicker during image capture, the method comprising:

performing image capture to produce image capture data corresponding to an image capture scene, the image capture data including a first image having a first exposure and a second image having a second exposure;

processing the image capture data to:
(a) detect a discrepancy in the second image with respect to the first image; and
(b) determine flicker indication data indicative of a presence of flicker in the second image, and
in dependence upon said flicker indication data, correcting the discrepancy in said second image to produce a flicker-reduced version of the second image. This method reduces or eliminates flicker artefacts in the second image, which improves the perceived image quality. This also allows more reliable processing of the second image, for example for use in navigating an automated vehicle.

In some embodiments, determining said flicker indication data comprises calculating at least one parameter indicative of a likelihood of flicker being present in the second image, the at least one parameter comprising a parameter calculated in dependence on the detected discrepancy. The likelihood of flicker artefacts, as opposed to artefacts arising from, for example, sensor noise or motion of objects in the image capture scene, may thus be determined based on the detected discrepancy.

In examples, the second exposure is smaller than the first exposure, causing the second image to have greater flicker sensitivity than the first image.

In further examples:
the first image is a video frame of a first sequence of video frames;
the second image is a video frame of a second sequence of video frames; and
the at least one parameter comprises a parameter calculated from a detected discrepancy between a prior video frame of the first sequence and a corresponding prior video frame of the second sequence. The performance of the flicker correction may thus be improved by, for example, assuming that where a previous video frame contained a motion artefact, a corresponding discrepancy in the present video frame is more likely to be due to motion than flicker.

In alternative or additional examples:
the first image is a video frame of a first sequence of video frames;
the second image is a video frame of a second sequence of video frames; and
the at least one parameter comprises a parameter calculated from a detected discrepancy between the second image and a flicker-reduced version of a prior video frame of the second sequence. This allows the flicker detection to be based on changes over time. For example, where a change from a previous frame to the present frame is consistent with a flicker artefact, the flicker correction may take into account an increased likelihood of the change being in fact caused by flicker.

In an embodiment, correcting of the discrepancy in said second image comprises combining said second image with a flicker-reduced version of said prior video frame of the second sequence.

Methods such as those described above are, in some embodiments, performed in real time to produce a flicker-reduced version of the second sequence. This allows the flicker-reduced version to be transmitted, for example by streaming, as the video frames are captured. In one such example, the flicker-reduced version is processed in real time as an input to an automated vehicle, based on which the vehicle is navigated.

In an embodiment, the method comprises:
capturing the first image with a first array of image sensor pixels; and
capturing the second image with a second array of image sensor pixels, the pixels of the second array having a lower sensitivity than the pixels of the first array. Such first and second sensor arrays can be used to reduce the severity of flicker artefacts, thereby improving the performance of the flicker reduction methods described above.

In examples, the method comprises forming an output high dynamic range image based on the first image and the flicker-reduced version of the second image. This improves the image quality of the output high dynamic range image. The output high dynamic range image may be formed based on the flicker indication data. This allows the HDR construction to take into account the presence or absence of flicker artefacts, further improving the quality of the output high dynamic range image.

In embodiments, the discrepancy between the first and second images is based on a predicted version of one of the first and second images, the predicted version being based on the other of the first and second images. For example, if the discrepancy is consistent with the presence of flicker, it can be assumed that the discrepancy was caused by flicker.

Alternatively or additionally, the method may comprise:
determining from the flicker indication data whether the discrepancy is due to the presence of flicker in the second image;
if the discrepancy is determined to be due to the presence of flicker in the second image, applying a flicker reduction correction to said second image; and
if the discrepancy is determined not to be due to the presence of flicker in the second image, not applying the flicker reduction correction to said second image. Flicker correction is thus only applied where flicker is determined to be present, improving the performance of the flicker correction. If the discrepancy is determined not to be due to the presence of flicker in the second image, a motion correction may be applied to said second image.

According to a further aspect of the present disclosure, there is provided an apparatus for reducing artefacts caused by the presence of flicker during image capture, the apparatus comprising:
a receiver configured to receive image capture data corresponding to an image capture scene, the image capture data including a first image having a first exposure and a second image having a second exposure; and
a processor configured to process the image capture data to:
(a) detect a discrepancy in the second image with respect to the first image; and
(b) determine flicker indication data indicative of a presence of flicker in the second image,
the processor being configured to, in dependence on said flicker indication data, correct the discrepancy in said second image to produce a flicker-reduced version of the second image.

According to another aspect, there is provided a non-transitory computer-readable storage medium comprising a set of computer-readable instructions stored thereon which, when executed by at least one processor, cause the at least one processor to:
receive image capture data corresponding to an image capture scene, the image capture data including a first image having a first exposure and a second image having a second exposure;
process the image capture data to:
(a) detect a discrepancy in the second image with respect to the first image; and
(b) determine flicker indication data indicative of a presence of flicker in the second image, and
in dependence upon said flicker indication data, correct the discrepancy in said second image to produce a flicker-reduced version of the second image.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 2:
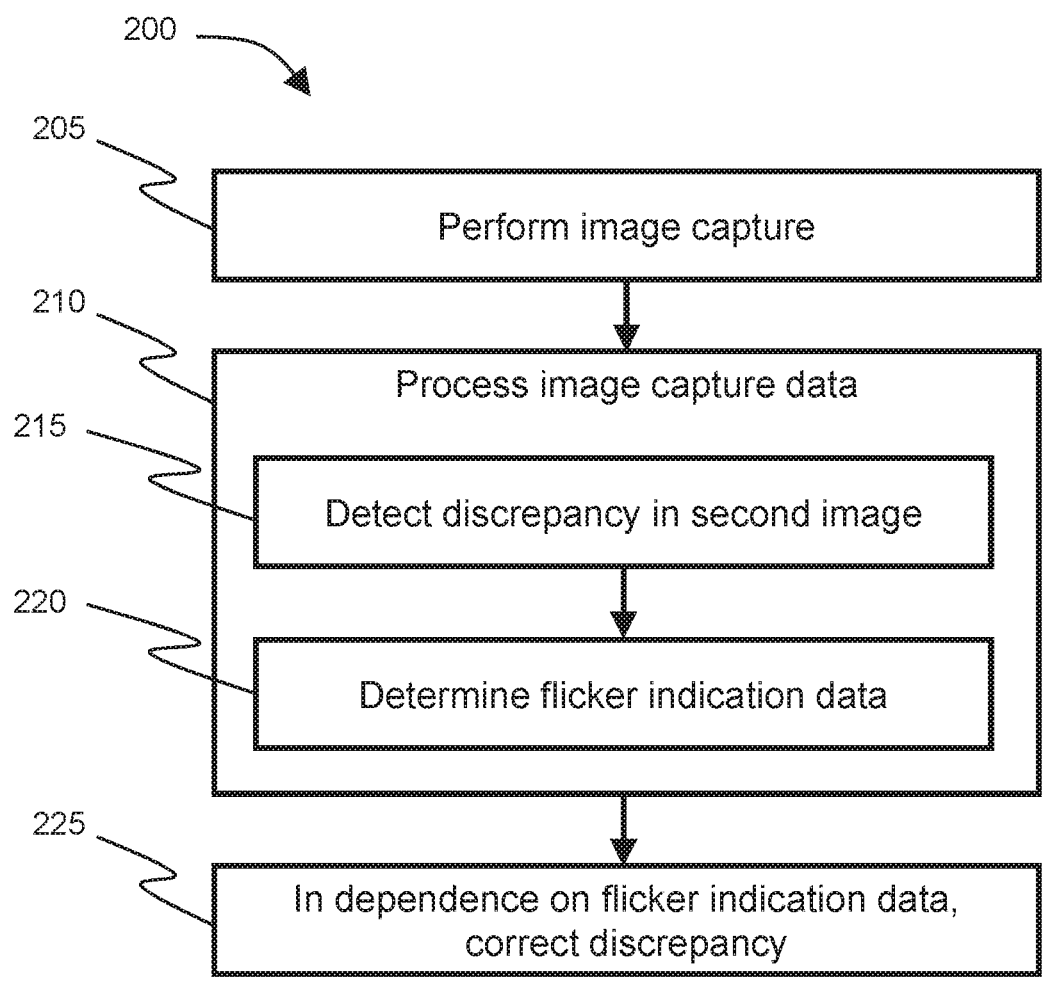
FIG. 2 shows a schematic representation of a method for reducing artefacts caused by the presence of flicker during image capture.

FIG. 2 shows a schematic representation of a method 200 for reducing artefacts caused by the presence of flicker during image capture.

The method 200 comprises a step 205 of producing image capture data corresponding to an image capture scene. The image capture data includes a first image having a first exposure and a second image having a second exposure.

The term "exposure" is used herein to refer to the sensitivity of an image to incident light. Exposure may be varied by changing parameters of an imaging device such as a camera. For example, exposure may be reduced by reducing the length of time that light is incident on an image sensor, for example by reducing the length of time for which a shutter is held open. This may be termed the integration time. Another example of such a parameter is the analogue and/or digital gain of the image sensor, which expresses the sensitivity of the sensor to light. A third example of such a parameter is the focal ratio, or "f-stop". The exposure of an image may be expressed as a function of at least one of these parameters, for example as a single value expressing the overall sensitivity to light. For example, doubling the gain of the image sensor and halving the integration time may have no net effect on the exposure. A combination of settings resulting in a higher sensitivity to light may be termed a greater exposure, and a combination of settings resulting in a lower sensitivity to light may be termed a smaller exposure. As is common in the art, the term "exposure" may also be used to refer to an image with a particular exposure value.

The method 200 comprises a step 210 of processing the image capture data. The image capture data is processed to, at block 215, detect a discrepancy in the second image with respect to the first image. The image capture data is further processed to, at block 220, determine flicker indication data indicative of a presence of flicker in the second image. For example, the flicker indication data may indicate that the discrepancy is due to flicker.

The method 200 comprises a step 220 of, in dependence on said flicker indication data, correcting the discrepancy in said second image to produce a flicker-reduced version of the second image. For example, it may be determined from the flicker indication data whether the discrepancy is due to the presence of flicker in the second image. If the discrepancy is determined to be due to the presence of flicker in the second image, a flicker reduction correction can be applied to said second image. If the discrepancy is determined not to be due to the presence of flicker in the second image, the flicker reduction correction is not applied to said second image.

Figure 3:
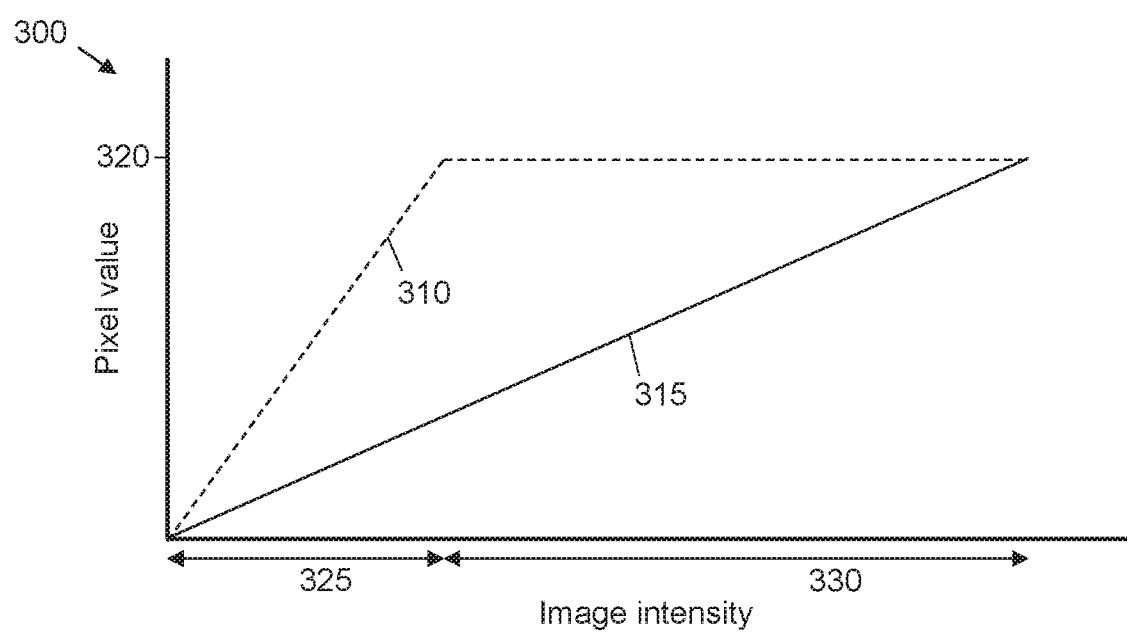
FIG. 3 shows a graph plotting pixel value as a function of image intensity for two different image exposures.

In some examples, the second exposure is smaller than the first exposure, for example by way of having a shorter integration time. FIG. 3 shows a graph 300 plotting pixel value as a function of image intensity for the first, greater exposure 310, and the second, smaller, exposure 315. A maximum pixel value 320 represents the maximum pixel value that may be output from the image sensor. For example, for a 12-bit image sensor, pixel values range from zero to a maximum pixel value of 4095. It can be seen that for the first exposure 310, the full range of pixel values is used to represent a range 325 of the darker image intensities and the maximum pixel value 320 is used for any image intensity higher than the range 325. Thus the first exposure produces an image that shows detail in darker regions and is saturated in brighter regions. However, in this example, the integration time of the first image is sufficiently long that the exposure covers a large number of flicker cycles, for example ten or more cycles. A consequence of this is that the captured intensity does not vary significantly between images captured at different times relative to the flicker timing. The first image is thus relatively resilient to flicker artefacts.

For the second, smaller, exposure 315, the full range of pixel values is used to represent a wider range 325+330 of image intensities. In this example, the maximum pixel value 320 is only used to represent the maximum image intensity, and thus the second image represents the full range of image intensities without saturating. In other examples the second exposure is larger than this, such that the range of intensities covered without saturating is wider than for the first image but not sufficiently wide to cover the entire range of image intensities without saturating.

Figure 1A:
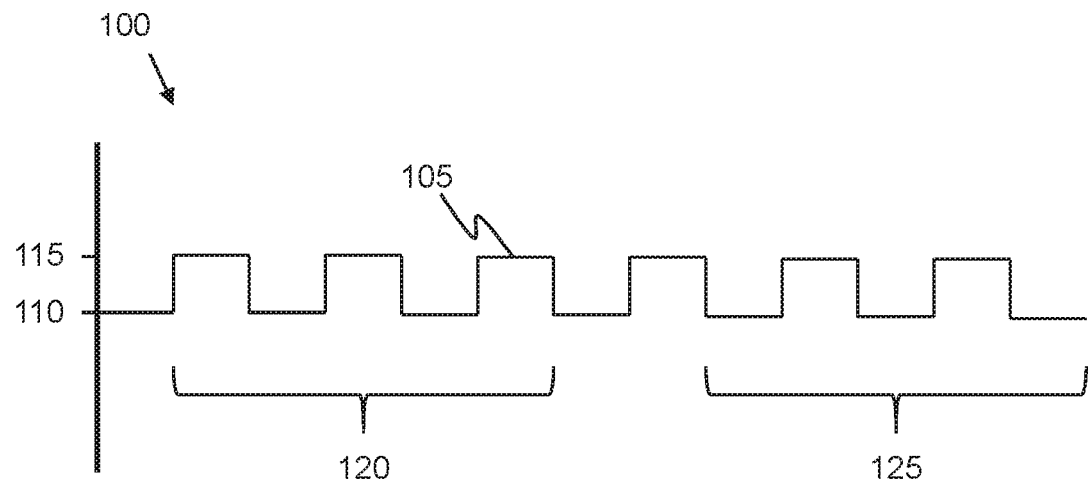
FIGS. 1A and 1B show schematic representations of the origin of flicker artefacts in a captured image.
Figure 1B:
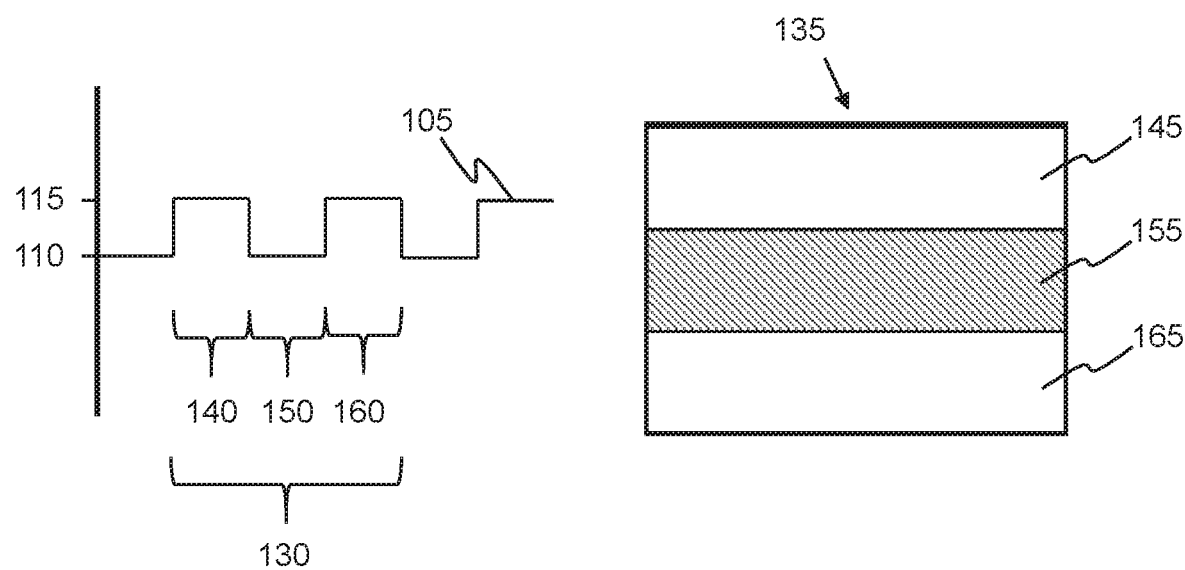

In this example, the integration time of the second image is sufficiently short that the exposure covers a small number of flicker cycles, for example two or three cycles. A consequence of this is that, as described above in relation to FIG. 1, the captured intensity varies significantly between images captured at different times relative to the flicker timing. The second image is thus vulnerable to flicker artefacts.

The first and second exposures may each be expressed as a single value, with the single values being functions of parameters that influence the light sensitivity of an image as described above. The relationship between the first and second exposures can thus be expressed as a ratio of these single values. Corresponding pixels of the first and second images would then be expected to have a relationship based on this ratio. For example, if the first exposure is 16 times that of the second exposure, a given non-saturated pixel of the first image would be expected to have a value 16 times higher than the value of the corresponding pixel of the second image.

As noted above in relation to FIG. 2, the method 200 comprises, at block 215, detecting a discrepancy in the second image with respect to the first image. In some examples, this discrepancy is based on a predicted version of one of the first and second images, the predicted version being based on the other of the first and second images. For example, the predicted version may be based on the expected ratio between corresponding pixel values of the first or second images. In this example, each pixel of a predicted version of the first image would have a value 16 times higher than the corresponding pixel of the second image, up to the maximum value 320. A discrepancy can then be detected as a difference between a predicted pixel value of the first image and the corresponding actual pixel value of the first image. In other words, a discrepancy can be detected as a deviation from the expected ratio between pixel values of the first and second images.

There are various potential causes for such a discrepancy, including flicker and movement. Deviations from the expected ratio also arise from noise in the image sensor. Such deviations can typically be characterised based on factors such as incident light intensity and ambient temperature. The magnitude of such deviations can thus be predicted based on knowledge of the properties of the particular image sensor.

A discrepancy can be caused by flicker because, as described above, the second image is vulnerable to flicker artefacts. These artefacts can cause the entire second image, or parts of the second image, to be brighter or darker than would otherwise be predicted based on the exposure ratio of the second image to the first image. A discrepancy caused by flicker typically has a larger magnitude than would be expected from noise alone.

In examples, a second image is captured following, or prior to, the first image. A discrepancy can thus be caused by motion of an object in the image between capturing of the first image and capturing of the second image. A discrepancy caused by motion typically has a larger magnitude than a discrepancy caused by flicker.

As noted above in relation to FIG. 2, the method 200 comprises, at block 220, determining flicker indication data indicative of a presence of flicker in the second image. Determining the flicker indication data may comprise comparing the determined discrepancy to predefined lower and upper thresholds. For example, the discrepancy may be determined to be caused by flicker if its magnitude is larger than would be expected from noise, but smaller than would be expected from motion.

Embodiments of the method 200 will now be described with reference to FIGS. 4A to 4D.

Figure 4A:
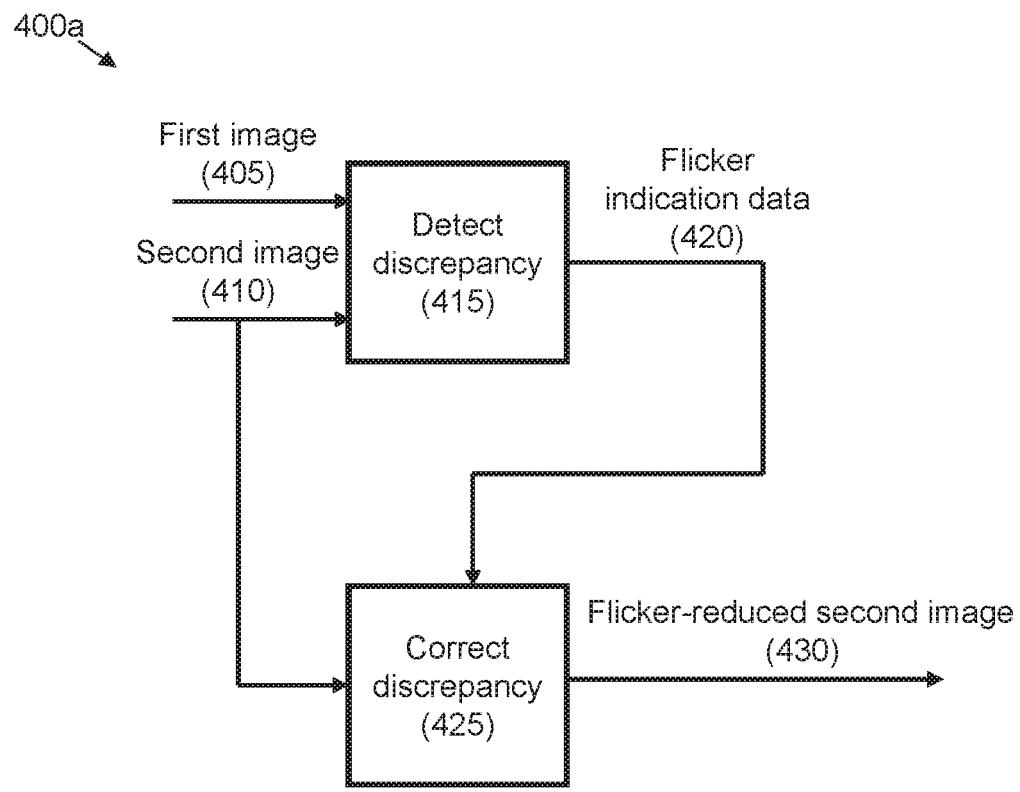
FIGS. 4A to 4D show example methods for reducing flicker artefacts in an image.

FIG. 4A shows an example 400a of the method 200. A first image 405 and a second image 406 are captured. At block 415, a discrepancy is detected between the first and second images 405, 410. Flicker indication data 420 is determined.

Determining the flicker indication data can comprise calculating at least one parameter indicative of a likelihood of a flicker being present in the second image 410. The at least one parameter comprises a parameter calculated in dependence on the calculated discrepancy. For example, the parameter may be a binary flag indicating a presence of flicker. As another example, the parameter may indicate a confidence in the presence of flicker. For example, if the discrepancy is close to the lower or upper threshold described above, the confidence in the presence of flicker will be lower. In some examples, the at least one parameter includes an indication of whether the second image 410, or a given part thereof, is brighter or darker than would be predicted based on the first image 405. Alternatively or additionally, the at least one parameter may include an indication of the local distribution of flicker artefacts. In one example, where a banding artefact is present as described above in relation to FIG. 1B, the at least one parameter may include an indication of the pixels which form the dark band.

At block 425 the discrepancy is corrected, in dependence on the flicker indication data 420, to produce a flicker-reduced version 430 of the second image 410. In one example, in which the flicker indication data 420 comprises a parameter indicating that the second image 410 is brighter or darker than the prediction based on the first image 405, the discrepancy is corrected by darkening or brightening the second image 410 accordingly. This correction may be performed globally, or locally on a pixel-by-pixel or region-by-region basis.

Figure 4B:
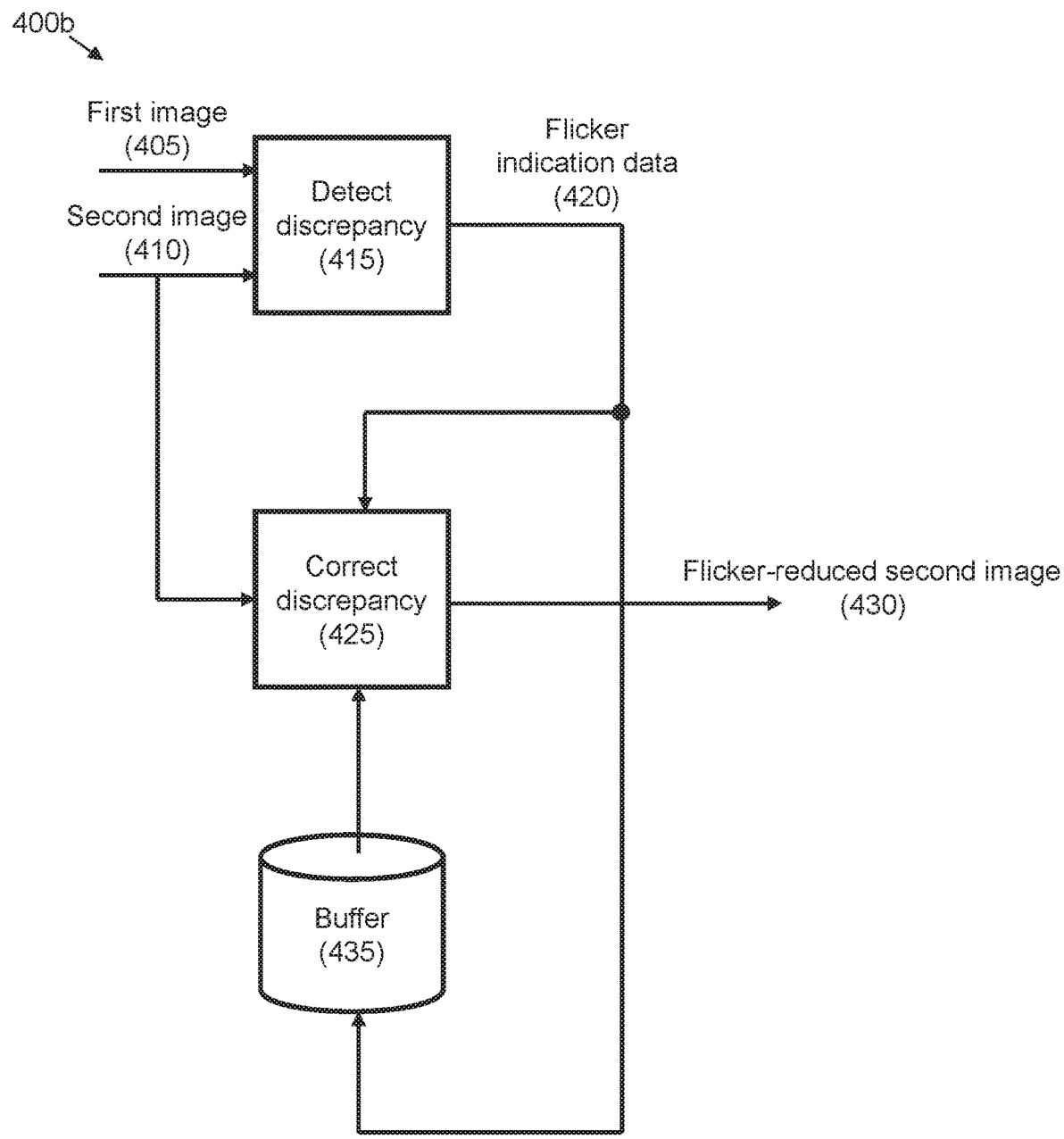

FIG. 4B shows an example 400b of the method 200. The example 400b includes the elements of the example 400a as described above in relation to FIG. 4A. In the example 400b, the first image 405 is a video frame of a first sequence of video frames and the second image 410 is a video frame of a second sequence of video frames. In an example, frames of the first and second sequences are captured alternately, such that a given frame of the first sequence is captured with a first exposure, followed by a corresponding frame of the second sequence with a second exposure, followed by a further frame of the first sequence with the first exposure, and so on. The first sequence thus comprises a higher-exposure video, and the second sequence comprises a lower-exposure video of the same scene.

The flicker indication data 420 corresponding to the first image 405 and second image 410 is stored in a buffer 435. The flicker indication data 420 may thus be used for correcting flicker artefacts in later video frames of the second sequence.

The at least one parameter, on which the discrepancy correction at block 425 is based, comprises a parameter calculated from a detected discrepancy between a prior video frame of the first sequence and a corresponding prior video frame of the second sequence. This parameter is retrieved from the buffer. A discrepancy between previous frames can thus be used to inform the correction of flicker in the present frames, i.e. the first and second images 405, 410. For example, the correction may be at least partially based on the assumption that where there was flicker, and not motion, in a previous frame, it is more likely that a discrepancy between the present frames is also due to flicker and not motion.

Figure 4C:
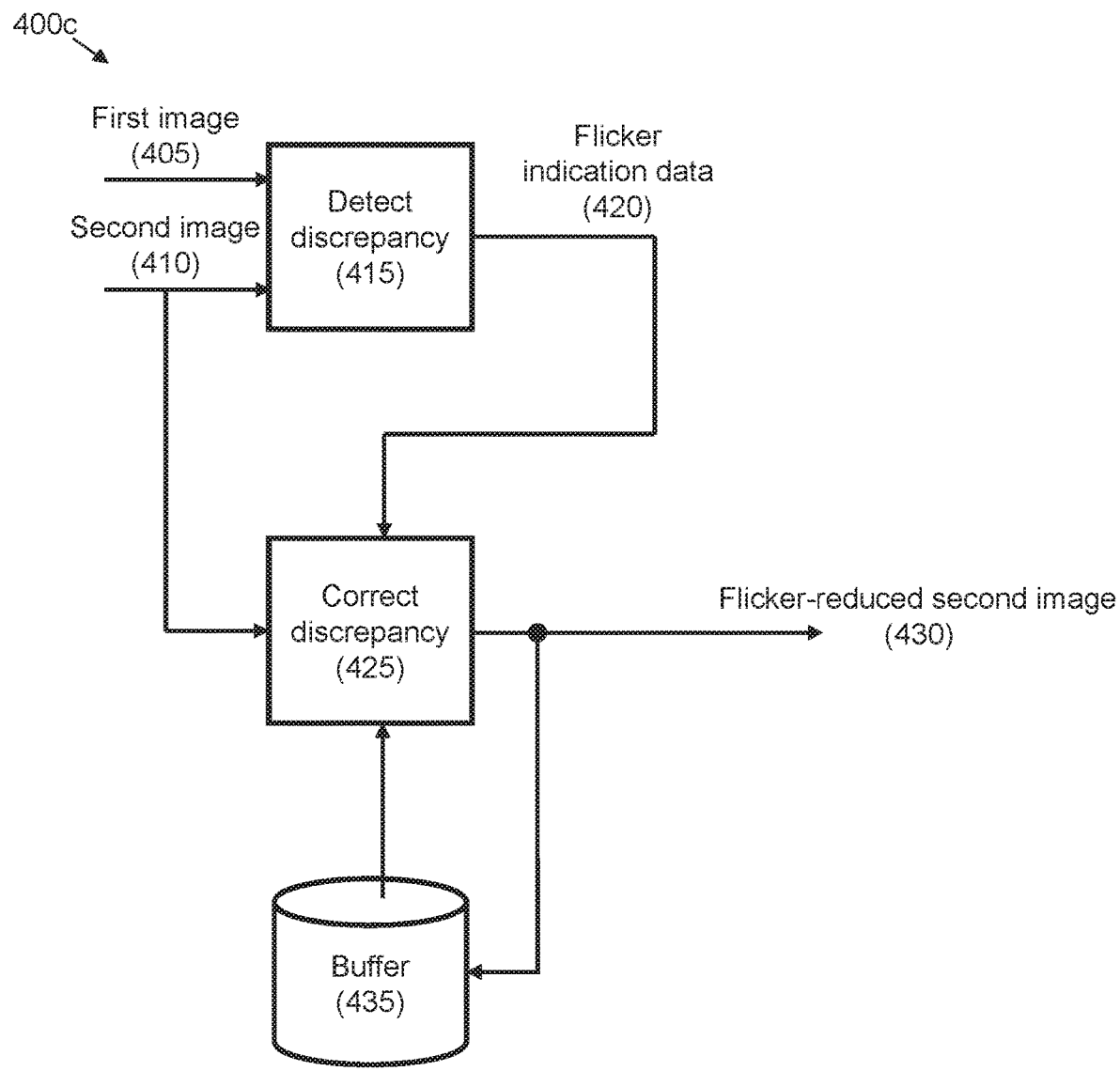

FIG. 4C shows an example 400c of the method 200. The example 400c includes the elements of the example 400a as described above in relation to FIG. 4A. Furthermore, as described above in relation to FIG. 4B, in the example 400c the first image 405 is a video frame of a first sequence of video frames and the second image 410 is a video frame of a second sequence of video frames.

The flicker-reduced version 430 of the second image 410 is stored in the buffer 435. The flicker reduced version 430 may thus be used for correcting flicker in subsequent frames of the second sequence. As such, in some embodiments, the correcting of the discrepancy in the second image 410, at block 425, comprises combining the second image 410 with a flicker-reduced version of a prior video frame of the second sequence. In one such embodiment, if it is determined that flicker artefacts are present in the second image 410, the flicker-reduced second image is formed by combining the second image 410 with the flicker-reduced version of the prior video frame, by taking a pixel-by-pixel average of the second image 410 and the flicker-reduced version of the prior video frame. Taking an average in this manner has an effect of smoothing out flicker artefacts, making them less severe. Conversely, if it is determined that a discrepancy is not caused by flicker but is instead, for example, caused by motion, the second image 410 can be output without performing any flicker correction. In some such examples, where it is determined that a discrepancy is not due to flicker, a motion correction is applied instead. An example motion correction algorithm is a "block matching" algorithm capable of searching for and identifying areas of the second image 410 strongly correlated with the first image 405. Such an algorithm would then determine vectors describing the "motion" in terms of a translation of that area of the second image 410 to select and combine with the corresponding area of the first image 405. This improves the reliability of such motion correction, as motion correction can be applied specifically when it is determined that a discrepancy is caused by motion and not flicker.

Alternatively or additionally, in some examples the at least one parameter comprises a parameter calculated from a detected discrepancy between the second image 410 and the flicker-reduced version of the prior video frame of the second sequence. Flicker in the present video frame, i.e. the second image 410, can thus be determined based on a comparison between the present video frame and a flicker-reduced version of a previous video frame. For example, if the discrepancy between the present frame and the previous frame is below a threshold associated with motion artefacts, it may be assumed that the discrepancy is caused by flicker, and not motion, and the parameter may be defined accordingly.

Figure 4D:
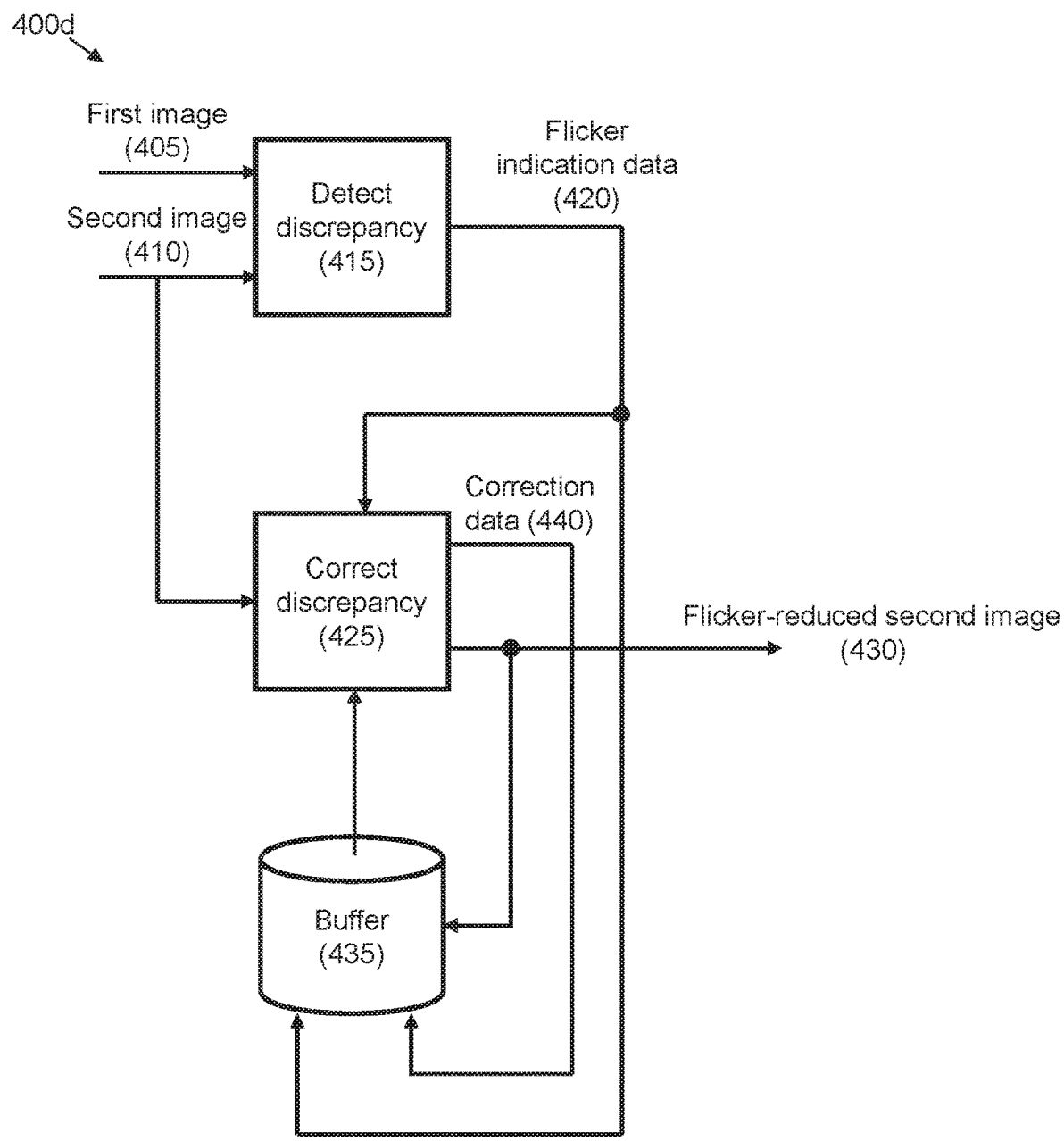

FIG. 4D shows an example 400d of the method 200. The example 400d includes all the elements of examples 400b and 400c as described above in relation to FIGS. 4B and 4C. In this manner, the flicker correction is based on the various parameters described above, in combination. This provides more accurate detection and correction of flicker artefacts.

In some embodiments, flicker correction data 440 is produced, describing the flicker correction that was applied to produce a given flicker-reduced image 430. This is stored in the buffer 435 for use in flicker correction of subsequent video frames. For example, where the flicker correction data 440 indicates that no flicker correction was applied to a prior frame, it may be assumed that flicker artefacts are less likely to be present in the present frame.

In some embodiments the methods 400b, 400c and/or 400d are performed in real time to produce a flicker-reduced version of the second sequence. This allows dynamic reduction of flicker artefacts in a video as it is recorded and/or streamed. In one example, video such as security camera video can be simultaneously displayed and stored with a reduction in visible flicker artefacts. In another example, flicker artefacts are reduced in a video stream that is used to navigate an automated vehicle, providing for more accurate and safer navigation.

Figure 5:
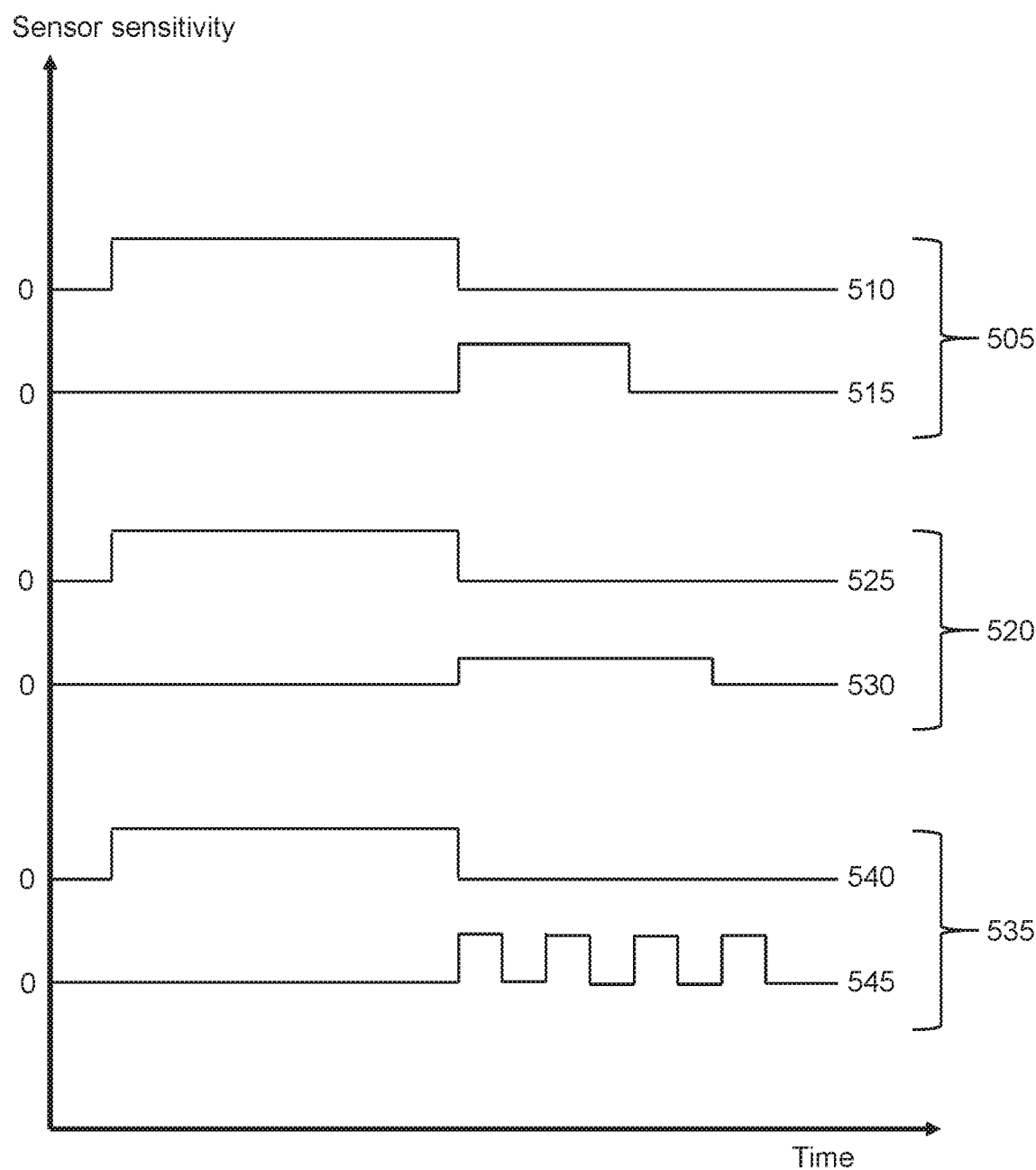
FIG. 5 shows a schematic representation of the capture of pairs of first and second images as a function of time.

FIG. 5 shows a schematic representation of the capture of pairs 505, 520, 535 of first and second images as described above, as a function of time. Each capture is shown as a line graph of sensor sensitivity which varies between zero, indicating that the sensor is not capturing an image, and a higher value, indicating that the sensor is capturing an image.

In a first pair 505 of images, a first image 510 is captured followed by a second image 515. As described above, the first image 510 has an integration time longer than that of the second image 515. This causes the first image 510 to have a greater exposure than the second image 515. A consequence of this is that, as described in more detail above, the second image 515 is sensitive to flicker.

In a second pair 520 of images, a first image 525 is captured followed by a second image 530. The capture of the first image 525 is the same as for the first image 510 of the first pair 505. The sensor sensitivity for the second image 530 is lower than for the first image 525. This integration time of the second image 530 is longer, to compensate for the reduced sensitivity. The overall exposure of the second image 530 is thus the same as the exposure of the second image 515 of the first pair 505. A consequence of the extended integration time is an increase in the number of flicker cycles captured by the second exposure 530. This reduces the flicker sensitivity of the second exposure 530. In some comparable examples, the sensor sensitivity for the second image 530 is sufficiently low that the same integration time can be used for the first and second images 525, 530.

In one such embodiment, the first image 525 is captured with a first array of image sensor pixels and the second image 530 is captured with a second array of image sensor pixels. The first and second arrays of pixels may be interleaved. The pixels of the second array have a lower sensitivity than the pixels of the first array. This allows capture of higher intensity light using a longer integration time, with a corresponding reduction in flicker artefacts, without saturating. For example, the pixels of the second array may be physically smaller than the pixels of the first array. In other examples, the pixels of the second array are filtered or electronically biased with respect to the pixels of the first array, to reduce their sensitivity to incident light.

In this example, the second image 530 is shown as being captured immediately following the first image 525. In other examples, the capturing of the second image overlaps, or is performed simultaneously with, the capturing of the first image.

In another such embodiment, the first image 525 and the second image 530 are captured with the same array of image sensor pixels. The sensitivity of the pixels is reduced during the integration time of the second image 530, for example by altering an electronic bias applied to the sensor pixels.

In a third pair 535 of images, a first image 540 is captured followed by a second image 545. The capture of the first image 540 is the same as for the first images 510, 525 of the first and second pairs 505, 520. The peak sensor sensitivity for the second image 545 is the same as for the first image 540. However, during capture of the second image 545, the image sensor alternates between this peak sensitivity and zero sensitivity. In other examples, the image sensor alternates between a peak sensitivity and a lower but non-zero sensitivity. The second image 545 is thus captured over a longer time than the integration time of the second image 515 of the first pair 505, whilst having the same overall exposure as the second image 515 of the first pair 505. This causes the capturing of second image 545 to cover a larger number of flicker cycles, reducing the flicker sensitivity of the second image 545.

The image capture techniques described above in relation to the second and third pairs of images 520, 535 allow the flicker sensitivity of a second image, with smaller exposure, to be reduced. However, residual flicker artefacts may still remain. These residual flicker artefacts may advantageously be removed using the flicker correction techniques described above in relation to FIGS. 2 and 4A to 4D. This use of flicker-reducing image capture in combination with the application of flicker correction to the produced images allows a more effective flicker reduction than the use of the flicker-reducing image capture, or flicker correction techniques, alone.

In some examples, a first image and a flicker-reduced version of a second image, as described above, may be used to construct a high dynamic range (HDR) image. An HDR image represents a wider dynamic range of luminosity than is typically possible with standard imaging techniques. One technique for capturing such an image is to capture multiple images in quick succession, each having a different exposure, and then to combine or "stitch" these into a single HDR image. For example, an image with a greater exposure is more sensitive to details in areas of low light, but saturated in brighter areas, whereas an image with a smaller exposure is more sensitive to details in areas of bright light, but exhibits loss of detail in dark areas. An HDR image may thus be formed by combining darker regions of the image with greater exposure with brighter regions of the image with smaller exposure. Construction of an HDR image in this manner is described in PCT publication WO2016/193329 to Apical Ltd.

Figure 6:
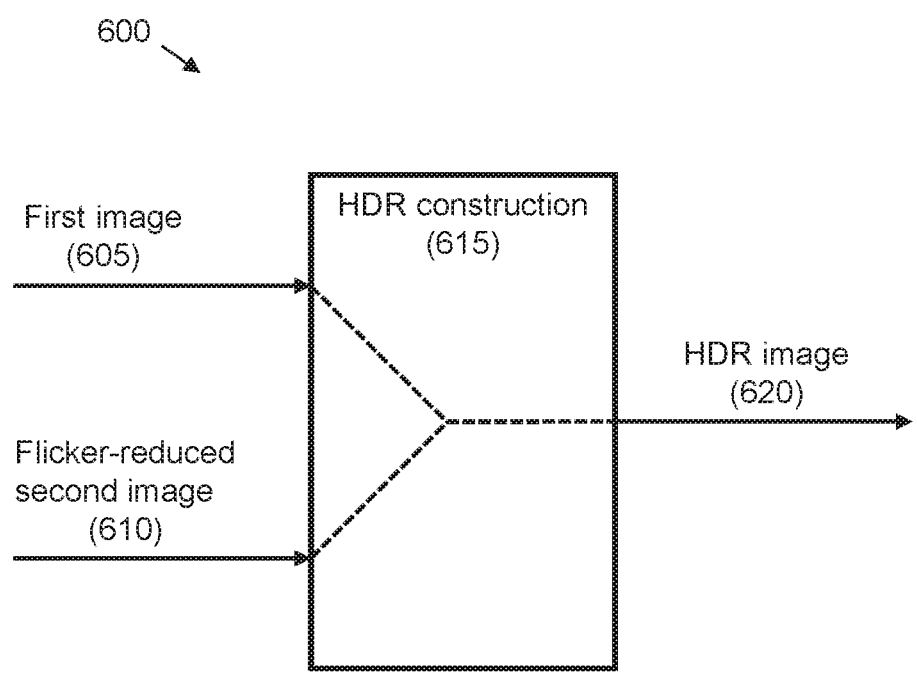
FIG. 6 shows a schematic representation of construction of an HDR image.

FIG. 6 shows a schematic representation 600 of construction of an HDR image in this manner. A first image 605 is provided as described above. A flicker-reduced version 610 of a second image is also provided. The flicker-reduced version 610 is produced from a second image using a flicker correction method for example as described above in relation to FIGS. 2 and 4A to 4D.

At block 615, an HDR image 620 is formed based on the first image 605 and the flicker-reduced version 610 of the second image. The HDR image 620 is output. Constructing the HDR image 620 from the flicker-reduced version 610 of the second image, as opposed to using the second image with no flicker correction, reduces the impact of flicker artefacts on the output HDR image 620 and thereby improves its quality.

In some examples, the output HDR image 620 is formed based on flicker indication data and/or flicker correction data, the flicker indication data and/or flicker correction data being generated as described above in relation to FIGS. 2 and 4A to 4D. The flicker indication data and/or flicker correction data can thus be fed forwards as an input to the HDR construction process at block 615. This allows the HDR construction to take into account knowledge of whether flicker and/or motion was present in the second image, and combine the first image 605 and flicker-reduced version 610 of the second image accordingly. This improves the quality of the output HDR image 620 beyond what would be possible without such feeding forward.

As an example of such feeding forward, it may be indicated that significant flicker reduction was applied to the second image to form the flicker-reduced version 610 such that the second image was significantly changed. In such a case, the HDR construction process may use the first, intrinsically flicker-resilient, image 605 in regions for which it would otherwise use the flicker-reduced version 610 of the second image. Conversely, it may be indicated that the flicker-reduced version 610 is reliably free of flicker. In this case, the HDR construction process may assume that any discrepancy between the first image 605 and reduced-flicker version of the second image 610 is due to motion, and construct the HDR image 620 accordingly.

Figure 7:
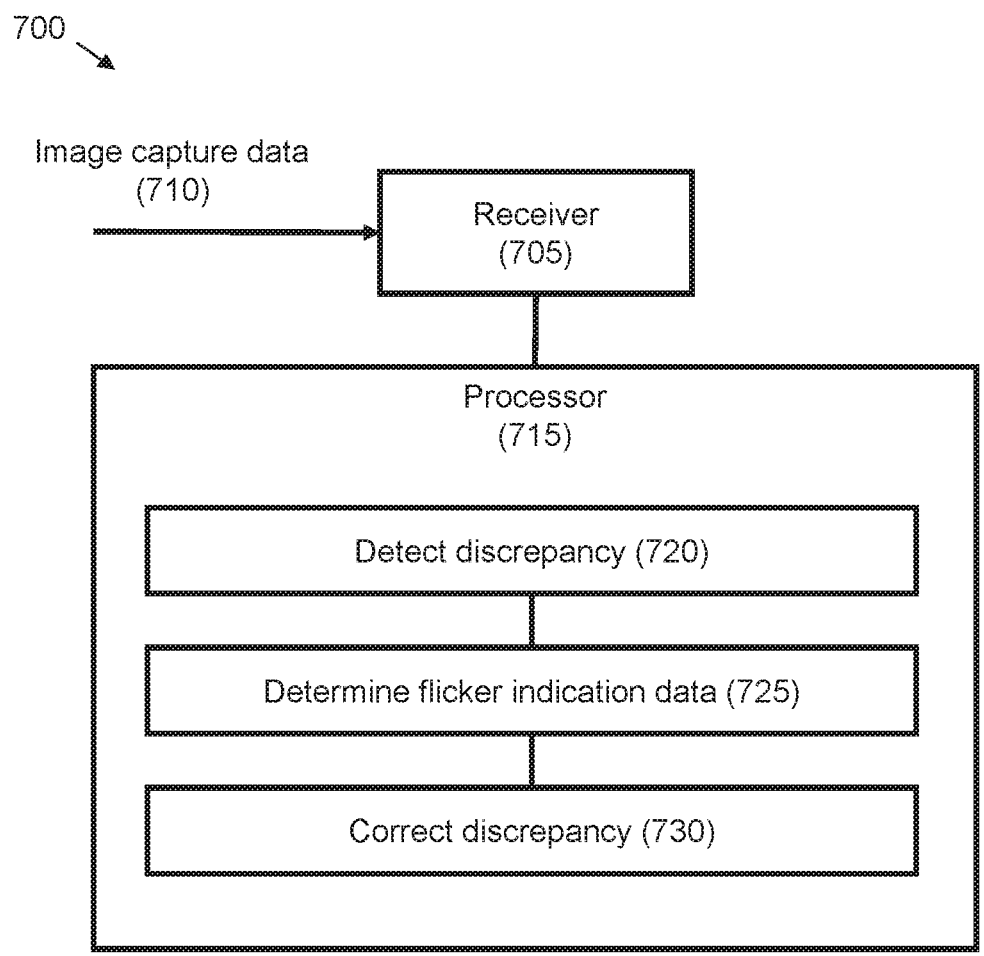
FIG. 7 shows a schematic representation of an apparatus for reducing artefacts caused by the presence of flicker during image capture.

FIG. 7 shows a schematic representation of an apparatus 700 for reducing artefacts caused by the presence of flicker during image capture, for example by performing a method as described above. The apparatus may for example be implemented by dedicated hardware, such as an application-specific integrated circuit. In other examples, the apparatus is implemented in general purpose hardware, for example as software executed by a general purpose computer. In some embodiments, the apparatus forms a component of an imaging system such as a camera.

The apparatus 700 comprises a receiver 705 configured to receive image capture data 710 corresponding to an image capture scene. The image capture data 710 includes a first image having a first exposure and a second image having a second exposure. In some examples in which the apparatus forms a component of an imaging system, the image capture data 710 is received directly from an image sensor of the imaging system. In other examples, the image capture data 710 is received from storage such as a buffer or other memory.

The apparatus 700 comprises a processor 715. The processor is configured to process the image capture data 710 to:

(a) at block 720, detect a discrepancy in the second image with respect to the first image; and (b) at block 725, determine flicker indication data indicative of a presence of flicker in the second image.

The processor 715 is further configured to, in dependence on said flicker indication data, correct the discrepancy in said second image to produce a flicker-reduced version of the second image.

In some embodiments, the apparatus 700 is further configured to perform additional elements of the flicker correction methods described above in relation to FIGS. 2 and 4A to 4D.

Figure 8:
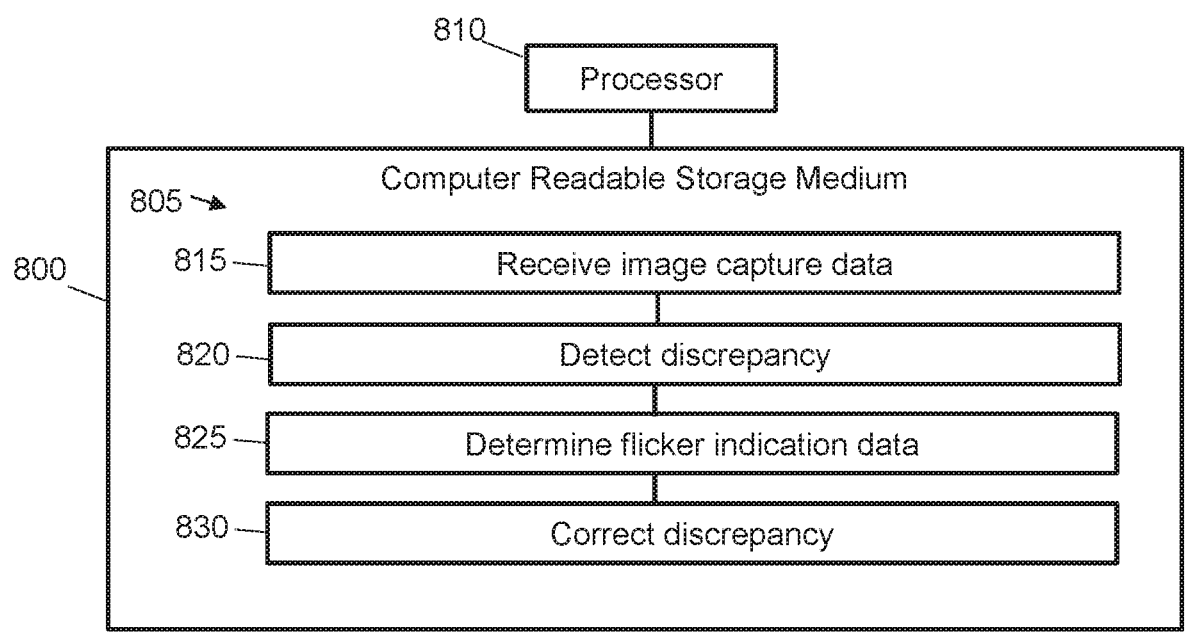
FIG. 8 shows an example of a non-transitory computer-readable storage medium according to an example.

FIG. 8 shows an example of a non-transitory computer-readable storage medium 800 comprising a set of computer readable instructions 805 which, when executed by at least one processor 810, cause the at least one processor 810 to perform a method according to examples described herein. The computer readable instructions 805 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 815, the instructions 805 cause the processor 810 to receive image capture data corresponding to an image capture scene, the image capture data including a first image having a first exposure and a second image having a second exposure.

At block 820, the instructions 805 cause the processor 810 to process the image capture data to detect a discrepancy in the second image with respect to the first image.

At block 825, the instructions 805 cause the processor 815 to determine flicker indication data indicative of a presence of flicker in the second image.

At block 830, the instructions 805 cause the processor 810 to, in dependence upon said flicker indication data, correct the discrepancy in said second image to produce a flicker-reduced version of the second image.

The above embodiments are to be understood as illustrative examples of the invention. Further embodiments of the invention are envisaged. For example, it is described above that flicker indication data may describe flicker globally across a whole image, or may describe flicker locally, on a pixel-by-pixel basis. In other embodiments, the flicker indication data describes flicker on a region-by-region basis. In one such embodiment, the flicker indication data comprises values indicating a confidence that flicker is present in regions of predefined size, for example 3×3 pixels. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for reducing artefacts caused by the presence of flicker during image capture, the method comprising:
performing image capture to produce image capture data corresponding to an image capture scene, the image capture data including a first image having a first exposure and a second image having a second exposure;
processing the image capture data to:
(a) detect a discrepancy in the second image with respect to the first image; and
(b) determine flicker indication data indicative of a presence of flicker in the second image;
determining from the flicker indication data whether the discrepancy is due to the presence of flicker in the second image;
if the discrepancy is determined to be due to the presence of flicker in the second image, applying a flicker reduction correction to said second image, the flicker reduction correction comprising processing the image capture data to correct the discrepancy in said second image to produce a flicker-reduced version of the second image; and
if the discrepancy is determined not to be due to the presence of flicker in the second image, not applying the flicker reduction correction to said second image.

2. The method according to claim 1, wherein determining said flicker indication data comprises calculating at least one parameter indicative of a likelihood of flicker being present in the second image, the at least one parameter comprising a parameter calculated in dependence on the detected discrepancy.

3. The method according to claim 2, wherein:
the first image is a video frame of a first sequence of video frames;
the second image is a video frame of a second sequence of video frames; and
the at least one parameter comprises a parameter calculated from a detected discrepancy between a prior video frame of the first sequence and a corresponding prior video frame of the second sequence.

4. The method according to claim 2, wherein:
the first image is a video frame of a first sequence of video frames;
the second image is a video frame of a second sequence of video frames; and
the at least one parameter comprises a parameter calculated from a detected discrepancy between the second image and a flicker-reduced version of a prior video frame of the second sequence.

5. The method according to claim 3, wherein the correcting of the discrepancy in said second image comprises combining said second image with a flicker-reduced version of said prior video frame of the second sequence.

6. The method according to claim 3, wherein the method is performed in real time to produce a flicker-reduced version of the second sequence.

7. The method according to claim 1, wherein the second exposure is smaller than the first exposure.

8. The method according to claim 1, comprising:
capturing the first image with a first array of image sensor pixels; and
capturing the second image with a second array of image sensor pixels, the pixels of the second array having a lower sensitivity than the pixels of the first array.

9. The method according to claim 1, comprising forming an output high dynamic range image based on the first image and the flicker-reduced version of the second image.

10. The method according to claim 9, comprising forming the output high dynamic range image based on the flicker indication data.

11. The method according to claim 1, comprising detecting the discrepancy between the first and second images based on a predicted version of one of the first and second images, the predicted version being based on the other of the first and second images.

12. The method according to claim 11, comprising:
if the discrepancy is determined not to be due to the presence of flicker in the second image, applying a motion correction to said second image.

13. The method according to claim 1, wherein the first image is captured over a number of flicker cycles which exceeds a threshold number for the first image to be substantially resilient to flicker.

14. The method according to claim 1, wherein the first image is captured over at least ten flicker cycles.

15. The method according to claim 1, wherein the second image is captured over a smaller number of flicker cycles than the first image.

16. An apparatus for reducing artefacts caused by the presence of flicker during image capture, the apparatus comprising:
a receiver configured to receive image capture data corresponding to an image capture scene, the image capture data including a first image having a first exposure and a second image having a second exposure; and
a processor configured to process the image capture data to:
(a) detect a discrepancy in the second image with respect to the first image; and
(b) determine flicker indication data indicative of a presence of flicker in the second image,
the processor being configured to:
determine from the flicker indication data whether the discrepancy is due to the presence of flicker in the second image;
if the discrepancy is determined to be due to the presence of flicker in the second image, apply a flicker reduction correction to said second image, the flicker reduction correction comprising processing the image capture data to correct the discrepancy in said second image to produce a flicker-reduced version of the second image; and
if the discrepancy is determined not to be due to the presence of flicker in the second image, not apply the flicker reduction correction to said second image.

17. The apparatus according to claim 16, wherein:
the first image is a video frame of a first sequence of video frames;
the second image is a video frame of a second sequence of video frames; and
determining said flicker indication data comprises calculating at least one parameter indicative of a likelihood of flicker being present in the second image, the at least one parameter comprising a parameter calculated from a detected discrepancy between a prior video frame of the first sequence and a corresponding prior video frame of the second sequence.

18. The apparatus according to claim 16, wherein:
the first image is a video frame of a first sequence of video frames;
the second image is a video frame of a second sequence of video frames; and
the at least one parameter comprises a parameter calculated from a detected discrepancy between the second image and a flicker-reduced version of a prior video frame of the second sequence.

19. A non-transitory computer-readable storage medium comprising a set of computer-readable instructions stored thereon which, when executed by at least one processor, cause the at least one processor to:
receive image capture data corresponding to an image capture scene, the image capture data including a first image having a first exposure and a second image having a second exposure;
process the image capture data to:
(a) detect a discrepancy in the second image with respect to the first image; and
(b) determine flicker indication data indicative of a presence of flicker in the second image;
determine from the flicker indication data whether the discrepancy is due to the presence of flicker in the second image;
if the discrepancy is determined to be due to the presence of flicker in the second image, apply a flicker reduction correction to said second image, the flicker reduction correction comprising processing the image capture data to correct the discrepancy in said second image to produce a flicker-reduced version of the second image; and
if the discrepancy is determined not to be due to the presence of flicker in the second image, not apply the flicker reduction correction to said second image.

20. The non-transitory computer-readable storage medium according to claim 19, wherein:
the first image is a video frame of a first sequence of video frames;
the second image is a video frame of a second sequence of video frames; and
determining said flicker indication data comprises calculating at least one parameter indicative of a likelihood of flicker being present in the second image, the at least one parameter comprising a parameter calculated from a detected discrepancy between a prior video frame of the first sequence and a corresponding prior video frame of the second sequence.

* * * * *